UNITED STATES PATENT OFFICE.

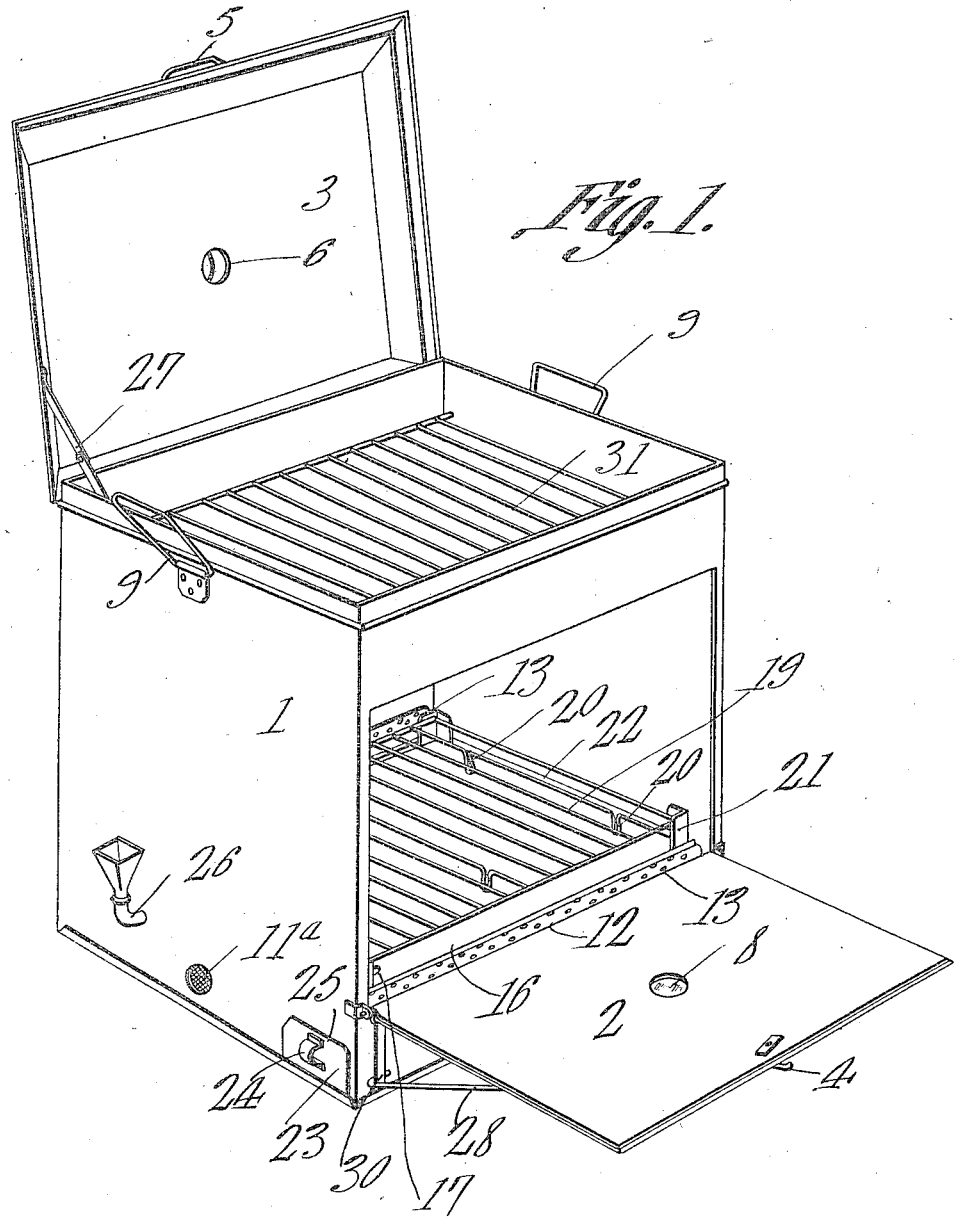

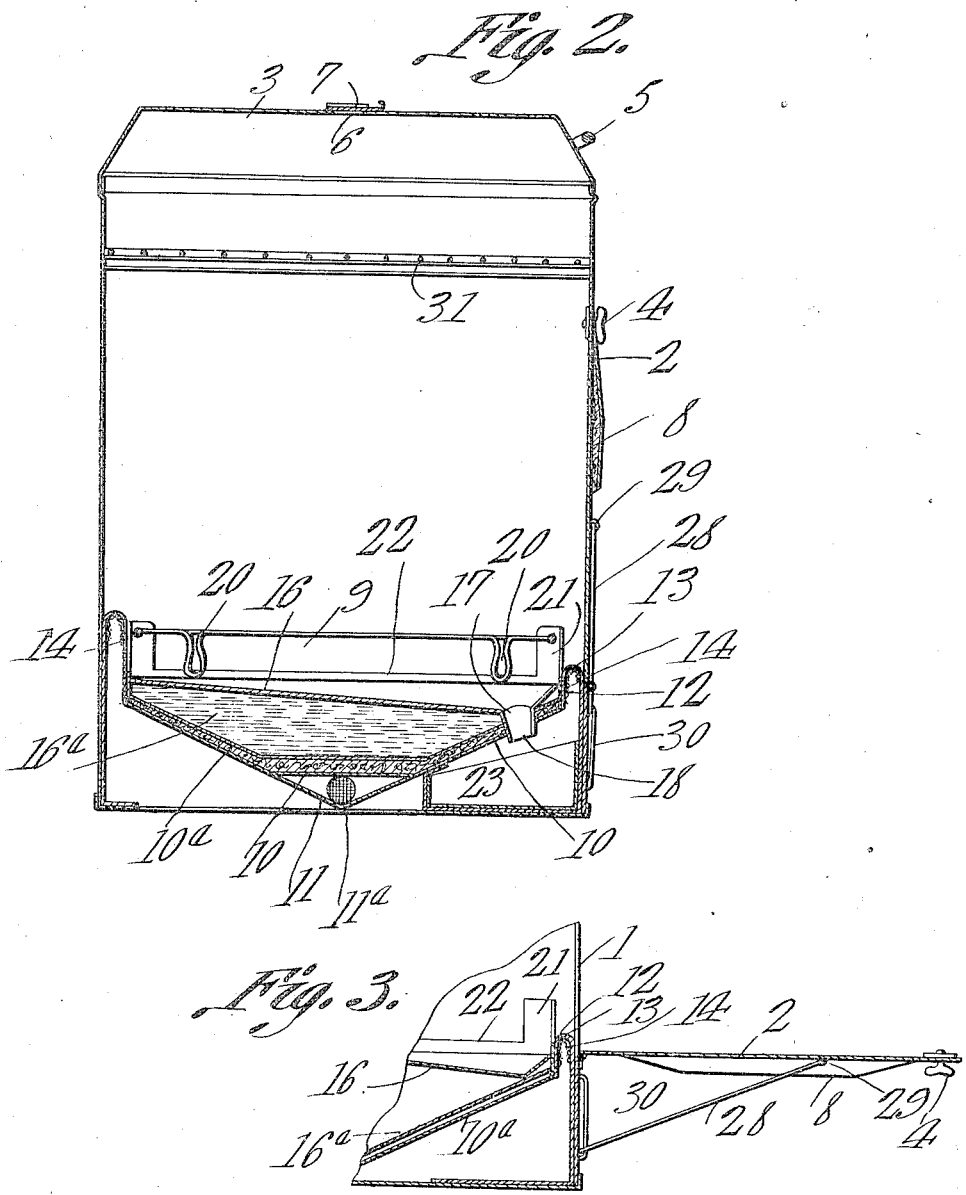

HERMANN KLEIN, OF MILWAUKEE, WISCONSIN.

MEAT-ROASTING APPARATUS.

1,051,503.  Specification of Letters Patent. Patented Jan. 28, 1913.

Application filed June 19, 1911. Serial No. 633,951.

*To all whom it may concern:*

Be it known that I, HERMANN KLEIN, a citizen of the United States, residing at Milwaukee, in the county of Milwaukee and State of Wisconsin, have invented a new and useful Meat-Roasting Apparatus, of which the following is a specification.

This invention relates to improvements in portable roasting ovens.

The invention has for its object to provide for suitably roasting meats of any kind, including fowls etc., while it is equally adapted for cooking other articles for food, as in baking potatoes, pastry and the like.
A further object is to perform the baking or roasting operation in an effective or satisfactory manner.

A still further object is to prevent gravy, as in roasting or basting meats, etc., from dropping into the fire, it being desirable to reserve the gravy for serving with the meat after having been roasted.

A still further object is to carry out the aforesaid ends in a simple and expeditious way.

In the accompanying drawings, illustrating the preferred embodiment of my invention, wherein it will be understood that various changes and modifications may be made as relates to the details of the construction and arrangement of the parts without departing from the spirit of my invention, Figure 1 is a perspective view of my improved portable roasting or basting oven, the same being in its open position. Fig. 2 is a vertical sectional view thereof, the same being in its closed position. Fig. 3 is a detailed fragmentary sectional view, disclosing more especially the lower door or closure propping means for supporting the same in suitable open position.

In carrying out my invention, I devise the oven of a suitable body portion or casing 1, which is preferably of the general outline indicated in the drawings, the same having a vertically and downwardly opening door 2 in its front portion and an upwardly and vertically opening door 3 forming its top end. The doors are suitably furnished or equipped one with the usual swiveled or turn button 4 for its retention in closed position and for opening and closing, the other or top door only requiring the use of a fingerhold 5. The top door or cover is also provided with an opening 6 about centrally therein, which is covered or controlled by a suitable slide or closure 7, for regulating the temperature within the oven, or reducing the same in event of excessive heating action. The door or closure 2 has a preferably central peep opening 8, therethrough. The oven 1 is also provided with suitable hand-holds or loops 9 for the convenient transportation of the same, as in lifting it into position upon, and removing it from the heater or burner, and carrying it from place to place.

A trough-like support, or bottom-forming member 10, is suitably disposed and supported preferably as shown, particularly by Fig. 2, in the lower part of the oven 1, said support having inclined lateral portions sloping toward its center, the central portion thereof forming an air space or chamber 11 communicating through preferably wire-net or gauze covered openings 11ª with the outside air, to modify the action of the heat directly impinging upon its underside to aid in preventing an excessive heating action thereon. It will be understood that the heating or heat-receiving chamber designated as 11 is included in the lower part of the oven, below the bottom-forming member 10, the heat-currents being received thereinto through a suitable opening in the oven-bottom from the burner or heater over which the oven may be placed. The support 10 has upstanding lateral hollow portions 12 for the reception of the heat currents from the heating chamber 11 below, said upstanding lateral portions having apertures or perforations 13 for the passage of said hot air-currents therethrough into the oven, to aid the heating action thereof. The hollow upstanding lateral portions 12 have applied to their inner surfaces, over the apertures or perforations 13, wire-netting 14 of the requisite fineness of mesh, to guard against sparks passing therethrough, into the oven.

Suitable heat non-conducting material, as asbestos 10ª is suitably interposed between trough-like supporting member 10 and the pan 16 to further aid in modifying or moderating the heating action or temperature of the oven. Also arranged within the oven 1, upon the bottom-forming member 10 is a pan 16, having its bottom conforming substantially to the corresponding surface of the member 10 and adapted to suitably hold or contain water as indicated for the purpose presently explained. The inner bottom surface of the pan 16, is suitably inclined or sloped toward a corner-edge thereof and an orifice 17 therein suitably spouted as at 18, to drain off the gravy, dropping from the roasting meat resting upon the grate later described, effects the suitable delivery of the gravy.

The pan 16 has a chamber 16ª formed intermediate its inner bottom or sloping gravy-receiving portion, and its bottom proper to contain water as indicated in Fig. 2 for keeping down the temperature of the pan and accordingly preventing the liability of the gravy received or dropping into said pan from "burning" or scorching as will be readily appreciated.

A grate 19, of suitable construction and having downwardly looped portions or pendants 20 serving as legs for the grate when removed from the oven, is suitably secured to pairs of upright angular corner-pieces or members 21 each pair being attached to, or formed in continuation of a longitudinal or base member 22 resting or supported upon the pan 16 as seen in Fig. 2. From this arrangement, it will be seen that the meat or article being placed upon the grate 19 and the oven adjusted in place upon a heater or burner, for instance of the gasolene type, or a gas range, gravy, falling from said meat when the roasting action takes place, will enter the pan 16 and, as before stated, be drained off and down the spout 18, while the meat will be subjected to the requisite and desired roasting or basting action which, as has been found in practice, is performed in an effective and satisfactory manner.

A preferably drawer-like receptacle 23, which is readily removable by engaging its handle 24, is inserted through an opening 25 in the oven 1, and into said oven and so as to occupy a position below, and receive the gravy drained downwardly through the spout 18 of the pan 16. The gravy, thus received into the drawer or receptacle 23, may be reserved for serving with the meat after having been roasted.

A funnel-equipped tube 26, is suitably inserted through and fixed in the oven, to provide for conveniently receiving and pouring water into the water or cooling chamber of the pan 16.

Suitable propping means, preferably as shown, may be, and are provided for suitably holding or sustaining the closures or doors 2 and 3 in open position, as indicated in Fig. 1. Said propping means comprise, as used in connection with the closure 3, a sectional jointed brace 27, with its sections pivotally connected to the closure and oven, respectively. As used in connection with the closure 2, the propping means may consist of opposed link members 28 having upper hooked or bent ends engaging eyes or staples 29 whose forming plates are suitably secured or riveted to the outer surface of the closure. The lower ends of said link-members are similarly bent or hooked and engage elongated staples or keepers 30 secured to the outer surface of the lower front portion of the oven 1.

In the upper portion of the oven is suitably arranged and supported in the usual way, as well understood, a second grate member 31 upon which may be baked potatoes and the like, as may be desired, which grate member may be readily removed and re-inserted as occasion may require.

From the foregoing description and accompanying illustration or drawing, it is believed that it has been made plain that my invention is characterized for effecting the roasting or basting operation in a perfect or satisfactory manner, and that the wasting or loss of the gravy is guarded against, also that the gravy is prevented from being possibly "burned" or scorched, and that it may be readily recovered and subsequently served with the meat after having been roasted; also that the gravy is intercepted from falling into the ash.

It is also observed that the invention is simple in construction, including but few parts, is readily manipulated and inexpensive of manufacture, while it may be used in connection with a gas-range, gasolene-burner, or be otherwise applied for receiving a heating action.

I claim:—

1. An oven comprising a pan having a gravy-draining bottom, a heating chamber within the lower portion of the oven, a bottom-forming member receiving and supporting said pan, and a cooling chamber intermediate said pan and said bottom-forming member, said bottom-forming member constituting the upper surface of said heating chamber, said pan having an outlet at its draining side.

2. A roasting oven comprising a trough-like bottom-forming member, a gravy-receiving and draining pan having its bottom conforming substantially to said trough-like bottom-forming member, a heating chamber within the lower portion of the oven, and a cooling chamber intermediate said pan and said trough-like bottom-forming member, said trough-like bottom forming member constituting the upper surface of said heating chamber, said pan having an outlet at its draining side.

3. A roasting oven comprising a trough-like bottom-forming member, a gravy-receiving pan having an inclined bottom with the slope directed toward a corner-edge or diagonally of the pan, said pan bottom also conforming substantially to said trough-like bottom forming member, a heating chamber within the lower portion of the oven, and a cooling chamber intermediate said pan and said trough-like bottom-forming member constituting the upper surface of said heating chamber, said pan having an outlet at the base of the inclination of its bottom.

4. A roasting oven comprising a heating chamber in the lower portion thereof, a gravy-receiving pan having a draining bottom, a trough-like bottom-forming member, said pan-bottom conforming substantially to said trough-like bottom forming member, said trough-like bottom-forming member constituting the top of said heating chamber, a water containing chamber intermediate said pan-bottom and said heating chamber, a receptacle to receive the drained gravy from said pan, and means for receiving and allowing the supply of water to said water-containing receptacle.

5. A roasting oven comprising a trough-like bottom-forming member, a gravy-receiving pan having its bottom conforming substantially to said trough-like bottom-forming member, said pan being provided with an outlet extending through said trough-like member and the bottom of said pan, and a heating chamber within the lower portion of the oven and whose upper surface is formed by said trough-like bottom-forming member.

6. A roasting oven comprising a trough-like bottom-forming member, a heating chamber within the lower portion of said oven and whose upper surface is formed by said trough-like bottom-forming member, said bottom-forming member having lateral upstanding perforated portions delivering a portion of the heat from said heating chamber into the upper portion of the oven, and a gravy-receiving pan having its bottom conforming substantially to said trough-like bottom-forming member, and means for effecting the discharge of the contents of said pan.

In testimony that I claim the foregoing as my own, I have hereto affixed my signature in the presence of two witnesses.

HERMANN KLEIN.

Witnesses:
 HERMANN PETSCH,
 E. W. BRAUN.